United States Patent [19]

Nathan et al.

[11] Patent Number: 4,690,809

[45] Date of Patent: Sep. 1, 1987

[54] PROCESS FOR THE PREPARATION OF ASBESTIFORM CRYSTALLINE CALCIUM SODIUM METAPHOSPHATE FIBERS

[75] Inventors: Vaidy R. Nathan; John T. Wang; James E. Downes, all of St. Louis, Mo.

[73] Assignee: Monsanto Company, St. Louis, Mo.

[21] Appl. No.: 924,674

[22] Filed: Nov. 5, 1986

Related U.S. Application Data

[63] Continuation-in-part of Ser. No. 812,042, Dec. 23, 1985, abandoned.

[51] Int. Cl.$^4$ ............................................. C01B 25/30
[52] U.S. Cl. ..................................... 423/306; 23/301; 423/314
[58] Field of Search .................. 423/306, 314; 23/301

[56] References Cited

U.S. PATENT DOCUMENTS 4,346,028  8/1982  Griffith ............................ 423/306

Primary Examiner—John Doll
Assistant Examiner—Wayne A. Langel
Attorney, Agent, or Firm—Wendell W. Brooks; Arthur E. Hoffman

[57] ABSTRACT

Asbestiform crystalline calcium sodium metaphosphate fibers are prepared by (a) forming a homogeneous melt of substantially crystalline calcium sodium metaphosphate having a composition on a dry basis equivalent to a $CaO/Na_2O/P_2O_5$ mol percent ratio of about 29.0–34.0/16.0–18.0/50.0–53.0 and a degree of crystallinity from about 60% to about 75% as determined from density and differential thermal analysis measurements, (b) supercooling the homogeneous melt, (c) seeding the supercool melt with calcium sodium metaphosphate crystals, (d) maintaining the seeded supercooled melt at the seeding temperature under isothermal conditions for a time sufficient to form crystalline blocks of calcium sodium metaphosphate, and (e) fiberizing the crystalline blocks.

20 Claims, No Drawings

PROCESS FOR THE PREPARATION OF ASBESTIFORM CRYSTALLINE CALCIUM SODIUM METAPHOSPHATE FIBERS

CROSS-REFERENCE TO RELATED APPLICATIONS

This application is a continuation-in-part of co-pending application Ser. No. 812,042, filed Dec. 23, 1985, abandoned.

BACKGROUND OF THE INVENTION

1. Field of the Invention

This invention relates to a process for the preparation of crystalline calcium sodium metaphosphate fibers. More particularly, this invention relates to a process for the preparation of asbestiform crystalline calcium sodium metaphosphate fibers. Such fibers are characterized by having the form or appearance of asbestos and by exhibiting an aspect ratio of at least 10, preferably at least 50, and an average diameter from about 0.5 micron ($\mu$m) to about 20 $\mu$m.

Asbestiform crystalline calcium sodium metaphosphate fibers are suitable for use as replacement fibers in many applications which historically have employed asbestos and other durable inorganic fibers as inorganic fibrous insulation and reinforcement materials.

DESCRIPTION OF THE PRIOR ART

Numerous durable inorganic fibers—asbestos, glass fibers, for example—are used in a wide variety of applications. Common among such applications are composites with organic polymeric material such as plastics, resins, natural and synthetic elastomers, and the like. Such composites are used to make floor tiles, gaskets, brake linings, clutch facings, and numerous other objects commonly found in industry and in the home.

The use of durable inorganic fibers such as asbestos and glass fibers as the inorganic fibrous material in the aforementioned applications in general provide satisfactory performance. However, such fibrous materials also suffer from certain disadvantages. For example, many of such fibrous materials, especially asbestos, have been found to expose workers as well as the general public to a potentially serious health hazard. It has been determined that the inhalation of small asbestos fibers can result in a disease known as asbestosis in which these fibers accumulate in the lungs, scar lung tissue, and cause many respiratory problems. It has become increasingly clear that inhalation of asbestos fibers over an extended period of time can lead to a cancer of the lining of the lungs known as mesothelioma as well as lung cancer. Numerous other durable inorganic fibers, for example, alkali metal titanates, are also suspected of causing similar health problems among users of such fibers. In addition, many inorganic fibers are rapidly soluble in water, dilute acids or dilute alkali which limits the usefulness of such fibers.

Accordingly, there exists a great need for an inorganic fibrous material suitable for use as an insulation fiber and as a reinforcing fiber in applications requiring the presence of inorganic fibrous materials which are not rapidly soluble in water, dilute acid or dilute alkali, and which do not present an undue health hazard to those exposed to such materials. Asbestiform crystalline calcium sodium metaphosphate fibers satisfy each of these requirements.

A unique feature of asbestiform crystalline calcium sodium metaphosphate fibers is the presence of a polyphosphate backbone which is believed to account for the lack of an undue health hazard to those exposed to such fibers. Polyphosphate chains, of course, are known to be biodegradable. As such, it is believed that, in contrast to durable inorganic fibers, biodegradation by enzyme-assisted hydrolysis of the polyphosphate backbone of asbestiform crystalline calcium sodium metaphosphate fibers should occur in vivo to facilitate dissolution thereof. The resulting calcium, sodium, and inorganic phosphate can then be utilized in the normal biochemical functions of the cell.

A process to prepare asbestiform crystalline calcium sodium metaphosphate fibers is known to the art. In U.S. Pat. No. 4,346,028, such fibers and a process to prepare same are disclosed. The process comprises forming a melt of a source of oxygen, calcium, phosphorus, and sodium having a mol percent ratio of about 15 mol percent to about 30 mol percent sodium oxide ($Na_2O$), about 48 mol percent to about 60 mol percent phosphorus pentoxide ($P_2O_5$), and about 20 mol percent to about 37 mol percent calcium oxide (CaO), maintaining the resulting mixture at a temperature below the melting point of the calcium sodium metaphosphate for a time sufficient to form blocks of calcium sodium metaphosphate, and fiberizing the blocks into asbestiform crystalline calcium sodium metaphosphate.

Although asbestiform crystalline calcium sodium metaphosphate fibers prepared by the process of the prior art are effective for contemplated end use applications, a process which can be readily adapted for batch, semicontinuous, or continuous operations would provide for increased efficiency in any commercial scale operation. Accordingly, research efforts are continually being made to define new or improved processes to more efficiently prepare asbestiform crystalline calcium sodium metaphosphate fibers. The discovery of the process of the instant invention provides such a process and, therefore, is believed to be a decided advance in the asbestiform crystalline calcium sodium metaphosphate fiber art.

SUMMARY OF THE INVENTION

It is an object of this invention to provide a process for the preparation of asbestiform crystalline calcium sodium metaphosphate fibers which can be adapted to batch, semicontinuous, and continuous operations.

Another object of this invention is to provide a process for the preparation of asbestiform crystalline calcium sodium metaphosphate characterized by exhibiting an aspect ratio of at least 10, preferably at least 50, and an average diameter from about 0.5 $\mu$m and about 20 $\mu$m.

To achieve these and other objects, together with the advantages thereof, which will become apparent from the accompanying description and claims, a process is provided for the preparation of asbestiform crystalline calcium sodium metaphosphate fibers, which process comprises:

(a) heating substantially crystalline calcium sodium metaphosphate, or at least one compound convertible by heat thereto, having a composition on a dry basis equivalent to a $CaO/Na_2O/P_2O_5$ mol percent ratio of about 29.0–34.0/16.0–18.0/50.0–53.0 and a degree of crystallinity from about 60% to about 75% as determined from density and differential thermal analysis measurements in a melting zone at a temperature and for a time sufficient to form a homogeneous melt;

(b) cooling the homogeneous melt in a cooling zone to a temperature and at a rate sufficient to form a supercooled melt;

(c) introducing into the supercooled melt at least one seed crystal of asbestiform crystalline calcium sodium metaphosphate;

(d) maintaining the seeded supercooled melt under isothermal conditions at the seeding temperature for a time sufficient to form crystalline blocks of asbestiform calcium sodium metaphosphate; and (e) fiberizing the crystalline blocks of asbestiform calcium sodium metaphosphate into fibers.

DESCRIPTION OF THE PREFERRED EMBODIMENTS

In accordance with this invention, a process is provided for the preparation of asbestiform crystalline calcium sodium metaphosphate fibers which are suitable for use as an insulation fiber and as a reinforcing fiber in applications requiring the presence of inorganic fibrous materials. These fibers are prepared by a process which comprises:

(a) heating substantially crystalline calcium sodium metaphosphate, or at least one compound convertible by heat thereto, having a composition on a dry basis equivalent to a $CaO/Na_2O/P_2O_5$ mol percent ratio of about 29.0–34.0/16.0–18.0/50.0–53.0 and a degree of crystallinity from about 60% to about 75% as determined from density and differential thermal analysis measurements in a melting zone at a temperature and for a time sufficient to form a homogeneous melt;

(b) cooling the homogeneous melt in a cooling zone to a temperature and at a rate sufficient to form a supercooled melt;

(c) introducing into the supercooled melt at least one seed crystal of asbestiform crystalline calcium sodium metaphosphate;

(d) maintaining the seeded supercooled melt under isothermal conditions at the seeding temperature for a time sufficient to form crystalline blocks of asbestiform calcium sodium metaphosphate; and (e) fiberizing the crystalline blocks of asbestiform calcium sodium metaphosphate into fibers.

The asbestiform crystalline calcium sodium metaphosphate fibers are high molecular weight phosphates $[CaNa(PO_3)_3]_n$ wherein n is a number representing the number of repeating $CaNa(PO_3)_3$ units. Fibers prepared in accordance with the process of the instant invention exhibit an aspect ratio (length-to-average diameter ratio, L/D) of at least 10, preferably at least 50, and an average diameter in the range from about 0.5 micron ($\mu m$) to about 20 $\mu m$, preferably from about 1 $\mu m$ to about 10 $\mu m$.

The substantially crystalline calcium sodium metaphosphate suitable for use in the process of the instant invention is that which will provide the desired asbestiform crystalline calcium sodium metaphosphate fiber.

The term "substantially crystalline" is employed herein to describe calcium sodium metaphosphate having a degree of crystallinity (DC) between about 60% and about 75%. The degree of crystallinity may be calculated from density measurements by Equation (1).

$$DC = [(d_{sc} - d_{Oc})/(d_{100c} - d_{Oc})] \times 100 \quad (1)$$

wherein:

$d_{sc}$ is the density of the substantially crystalline calcium sodium metaphosphate at 23° C.;

$d_{Oc}$ is the density of amorphos (DC=0%) of calcium sodium metaphosphate; and $d_{100c}$ is the density of crystalline (DC=100%) calcium sodium metaphosphate at 23° C. The value of $d_{100c}$ may be calculated from the crystal type and crystal lattice parameters obtained from wide angle X-ray diffraction measurements. The value of $d_{Oc}$ may be obtained via density measurements on samples exhibiting no apparent degree of crystallinity by X-ray diffraction or differential scanning calorimetric measurements.

Alternatively, DC may be calculated from the differential thermal analysis (DTA) peak area of a substantially crystalline calcium sodium metaphosphate sample at 749° C., the melting point of crystalline calcium sodium metaphosphate, relative to that of a crystalline (DC=100%) calcium sodium metaphosphate sample as a reference material by Equation (2).

$$DC = [(pa_{sc}/m_{sc})/(pa_{100c}/m_{100c})] \times 100 \quad (2)$$

wherein:

$pa_{sc}$ is the DTA peak area of the substantially crystalline calcium sodium metaphosphate sample at 749° C., the melting point of calcium sodium metaphosphate;

$m_{sc}$ is the mass or weight of the substantially crystalline calcium sodium metaphosphate sample;

$pa_{100c}$ is the DTA peak area of the crystalline (DC=100%) calcium sodium metaphosphate sample; and $m_{100c}$ is the mass or weight of the crystalline calcium sodium metaphosphate sample.

Referring to the substantially crystalline calcium sodium mataphosphate in terms of its dry basis calcium oxide (CaO)/sodium oxide ($Na_2O$)/phosphorus pentoxide ($P_2O_5$) composition equivalent, a mol percent ratio from about 29.0 to about 34.0 CaO, from about 16.0 to about 18.0 $Na_2O$, and from about 50.0 to about 53.0 $P_2O_5$, that is, a $CaO/Na_2O/P_2O_5$ mol percent ratio of about 29.0–34.0/16.0–18.0/50.0–53.0, has been found to consistently yield the desired asbestiform crystalline calcium sodium metaphosphate fibers. It is preferred to use a substantially crystalline calcium sodium metaphosphate having a composition on a dry basis equivalent to a $CaO/Na_2O/P_2O_5$ mol percent ratio of about 31.4–31.8/17.1–17.3/51.1–51.3, with a $CaO/Na_2O/P_2O_5$ mol percent ratio of about 31.6/17.2/51.2 being most preferred.

The substantially crystalline calcium sodium metaphosphate suitable for use as a starting material in the process of the instant invention can be prepared from any number of component source materials known to those skilled in the art so long as the stated $CaO/Na_2O/P_2O_5$ mol percent ratio is achieved. It is preferred, by virtue of the elemental composition of the substantially crystalline calcium sodium metaphosphate and, ultimately, that of the asbestiform crystalline calcium sodium metaphosphate to minimize the presence of anions other than carbonates, hydroxides, and phosphates, since the presence of more than trace amounts of anions such as sulfates, halides, and the like in the substantially crystalline calcium sodium metaphosphate tends to exert an adverse effect upon the production of the asbestiform crystalline calcium sodium metaphosphate. For convenience, the component source materials will be referred to herein as source material for CaO, $Na_2O$, and $P_2O_5$.

Suitable source materials for CaO include calcium phosphates and basic calcium-containing materials such as calcium carbonate, calcium oxide, calcium hydroxide, and mixtures thereof. Calcium hydroxide [Ca(OH)$_2$], also known as hydrated lime, is generally preferred in that it is readily available, can be easily mixed with the other source materials in aqueous media, and does not introduce any extraneous anions into the product.

Compounds suitable for use as the source material for $Na_2O$ include the sodium orthophosphates and condensed phosphates which contain at least one P-O-P linkage such as the metaphosphates and the pyrophosphates and the like, sodium hydroxide, sodium carbonate, and the like. For reasons similar to those stated for the preference for calcium hydroxide as the CaO source material, sodium hydroxide (NaOH) is preferred as the $Na_2O$ source material. Advantages accruing from the use of sodium hydroxide as the $Na_2O$ source material include its ready availability, its ease of mixing in aqueous media, and little, if any, undesirable foam formation during mixing operations.

Representative source materials for $P_2O_5$ include phosphorus pentoxide, orthophosphoric acid, and orthophosphate salts such as sodium dihydrogen orthophosphate, disodium hydrogen orthophosphate, trisodium orthophosphate, condensed phosphoric acids such as pyrophosphoric acid and polyphosphoric acid, and the sodium salts of condensed phosphoric acids. Among these materials, orthophosphoric acid ($H_3PO_4$) is preferred, with 85% $H_3PO_4$ being most preferred.

The purity of the source materials for CaO, $Na_2O$, and $P_2O_5$ must be such that the yield of the asbestiform crystalline calcium sodium metaphosphate is not affected adversely. Advantageously, it is preferred to use reagent grade materials to control the level of undesired impurities.

The substantially crystalline calcium sodium metaphosphate is prepared by bringing together the source materials for CaO, $Na_2O$, and $P_2O_5$ in proportions sufficient to provide a $CaO/Na_2O/P_2O_5$ mol percent ratio on a dry basis of about 29.0–34.0/16.0–18.0/50.0–53.0. The component source materials may be dry mixed or mixed by slurrying in aqueous media (water). In general, it is preferred to employ sufficient water to provide a wet mix slurry wherein the total solids concentration (sum of the concentrations of CaO, $Na_2O$, and $P_2O_5$) is from about 45% to about 50% by weight. When the wet mix slurry method is employed during the mixing operations, the wet mix slurry preferably is maintained at a temperature sufficient to prevent (or suppress) (a) foam formation, (b) excessive water loss, and (c) selective crystallization of sodium dihydrogen phosphate and calcium hydrogen phosphate, either of which could cause an adverse effect upon the $CaO/Na_2O/P_2O_5$ mol percent ratio and/or the total solids content of the wet mix slurry. In general, a preferred temperature ranges from about 40° C. to about 95° C.

Following the formation of the $CaO/Na_2O/P_2O_5$ mix, excess or residual water must be removed and the dried product calcined to yield the desired (calcined) substantially crystalline calcium sodium metaphosphate (hereinafter conveniently referred to as substantially crystalline calcium sodium metaphosphate). In general, heating for a nominal period of time up to about eight hours at a temperature in excess of ambient but less than the melting point of substantially crystalline calcium sodium metaphosphate, preferably from about 250° C. to about 450° C., most preferably from about 380° C. to about 420° C., is sufficient. At the preferred temperatures, especially at the most preferred temperatures, the $CaO/Na_2O/P_2O_5$ mix is dried and calcined in one step. Such one-step drying/calcination eliminates the tendency of the mix, due to the excess acid ($P_2O_5$) content, to form an agglomerated sticky mass (which complicates subsequent handling) when drying operations are carried out in a first step separate from the subsequent calcination step at temperatures less than the preferred temperatures.

The drying/calcination operation may be effected in any suitable apparatus known to the art. Nonlimiting examples include ovens or muffle furnaces containing fixed beds or moving beds, rotary kilns, and the like.

In a preferred embodiment, when the preferred wet mix slurry operation is employed, the wet mix slurry advantageously is dried and calcined in the previously noted one-step operation. Such one-step operation is readily accomplished by spraying the wet mix slurry onto a heated bed of (previously) calcined substantially crystalline calcium sodium metaphosphate maintained at a temperature from about 380° C. to about 420° C., usually about 400° C., at a rate sufficient to cause substantially instantaneous drying and calcination of the $CaO/Na_2O/P_2O_5$ wet mix slurry. Such drying/calcination advantageously is carried out in an internally fired rotating calcination apparatus, although any other suitable apparatus known to the art of the type previously noted may be employed, if desired.

The substantially crystalline calcium sodium metaphosphate recovered from the calcination operation, is suitable for use in the process of the instant invention. It will be noted, however, that while substantially crystalline calcium sodium metaphosphate is the starting material of choice for use in the instant process, the direct charging of substantially crystalline calcium sodium metaphosphate is not required. Any compound or mixture of compounds having a composition on a dry basis equivalent to a $CaO/Na_2O/P_2O_5$ mol percent ratio of about 29.0–34.0/16.0–18.0/50.0–53.0—calcium sodium orthophosphate and calcium sodium pyrophosphate, for example—which is convertible by heat to the substantially crystalline calcium sodium metaphosphate, and as such, may be considered as a precursor thereof, may be used to provide indirectly the required substantially crystalline calcium sodium metaphosphate via an in situ conversion under process conditions.

In accordance with the instant process, the substantially crystalline calcium sodium metaphosphate, or a compound convertible by heat thereto, having the desired $CaO/Na_2O/P_2O_5$ mol percent ratio is charged to a melting zone in a suitable container and heated at a temperature and for a time sufficient to form a homogeneous melt. Suitable temperatures will in general range from about 920° C. to about 980° C., although any temperature in excess of the melting point of the substantially crystalline calcium sodium metaphosphate (approximately 740° C.) up to about 1000° C. may be employed if desired. In general, however, the previously noted temperature from about 920° C. to about 980° C. is preferred in that temperatures outside this range provide no advantage and in certain circumstances may be disadvantageous.

The time required for formation of the homogeneous melt of calcium sodium metaphosphate is not narrowly critical and will depend, to some extent, upon the temperature employed. In general, however, a residence time in the melting zone of about two hours, especially at the preferred temperatures, is sufficient.

Following formation of the homogeneous melt, the calcium sodium metaphosphate is cooled in a cooling zone. In the cooling zone, the homogeneous melt is cooled below its melting point to a temperature from about 690° C. to about 735° C., preferably about 705° C. to about 730° C. at a rate and for a time sufficient to form a supercooled melt. Stated differently, the homogeneous melt is cooled at a rate sufficient to prevent the formation of glasses or self-nucleated by-products, each of which is undesirable in that in either situation the ultimate yield of crystalline calcium sodium metaphosphate suffers adversely. In general, a cooling rate from about 1° C. to about 3° C. per minute, preferably 1.5° C. per minute, is sufficient, thereby requiring a cooling zone residence time from about 1.0 hours to about three hours.

Once the desired melt temperature is achieved, usually the preferred 705° C. to 730° C., at least one seed crystal of asbestiform crystalline calcium sodium metaphosphate is introduced into the supercooled melt in a generally symmetrical pattern with respect to the surface of the supercooled melt. In general, the seed crystals are introduced at a rate sufficient to provide about one seed crystal for about each 100.0 cm$^2$ to about 1000.0 cm$^2$ of surface area of the supercooled melt. The temperature at which the seed crystal(s) is(are) introduced is thereafter maintained isothermally for a time sufficient to form crystalline blocks of asbestiform calcium sodium metaphosphate (crystallization time). In general, the time required to complete the crystallization process ranges from about five hours to about 15 hours, depending upon the amount of material and the number of seed crystals introduced. Usually, a crystallization time from about seven hours to about 10 hours is sufficient.

The crystalline mass of calcium sodium metaphosphate, for convenience of handling, is thereafter cooled to ambient (room) temperature and recovered for subsequent fiberization. The crystalline mass can be fiberized by conventional techniques such as grinding, crushing, levigating, triturating, milling, and the like. In general, in a preferred embodiment, the crystalline mass is broken apart, passed through a jaw crusher, and then fiberized by dry milling in an air classification mill or an air jet mill.

As previously noted, the melting/crystallization operation must be carried out in a suitable container. Materials of construction suitable for the containers (melting and crystallization vessels) used for the melting and crystallization steps of the instant process are not narrowly critical. All that is necessary is that (a) the material be able to withstand temperatures up to at least 1000° C. without softening and (b) the material does not react with, dissolve in, or contaminate the calcium sodium metaphosphate melt under the melting and crystallization (use) conditions. In addition, it is preferred, albeit not critical, that (a) the crystal blocks, once formed, are easily and cleanly separated from the containers without destroying the container and (b) the containers do not undergo destruction or deterioration under use conditions. It will be recognized, of course, that these characterizing properties of the materials of construction will permit repeated use of the containers, thereby providing a desirable economic advantage. Suitable materials of construction for the containers include graphite, noble metals such as platinum, palladium, rhodium, iridium, gold, and alloys thereof, refractory ceramics such as quartz, alumina, zirconia, and the like.

Of these materials, graphite is the material of choice in that it is readily available, relatively inexpensive, and meets all the stated requirements and advantages, especially when the melting and crystallization steps are carried out under a nonoxidizing atmosphere, that is, under a substantially inert atmosphere such as nitrogen, helium, argon, and the like, to prevent the oxidation of graphite which is known to occur at temperatures in excess of 500° C.

As noted with reference to the graphite containers, the process of the instant invention may be carried out in air or under a substantially inert atmosphere. When an inert atmosphere is desired, nitrogen, helium, argon, and the like may be employed to serve this purpose. Nitrogen, however, is preferred in that it is readily available and relatively inexpensive.

The instant process is suited to batch, semicontinuous, or continuous operations. In a preferred embodiment, each of these operations is conveniently carried out in a continuous mesh belt multiple zone furnace. The multiple zones of such furnace should comprise a melting zone (for melting the substantially crystalline calcium sodium metaphosphate), a first cooling zone (for forming a supercooled melt and introducing seed crystals into same), a crystallization zone (for crystallizing the the seeded supercooled melt), and, optionally, a second cooling zone (for cooling the crystalline mass to a convenient handling temperature, usually ambient temperatures). The crystalline mass may be conveyed to a jaw crusher, crushed into conveniently sized pieces, and fed into a milling apparatus for fiberization into fibers. In a semicontinuous operation, the substantially crystalline calcium sodium metaphosphate is periodically loaded into appropriate containers (preferably graphite trays) and fed into the continuous mesh belt furnace, with periodic interruptions for loading and unloading the furnace and/or charging the jaw crusher and/or fiberizing mill. On the other hand, in a continuous operation, such operations would involve automated operations without such periodic interruptions.

The asbestiform crystalline calcium sodium metaphosphate fibers prepared in accordance with the process of the instant invention, as previously noted, are characterized by exhibiting an aspect ratio of at least 10, preferably at least 50, and an average diameter in the range from about 0.5 $\mu$m to about 20 $\mu$m, preferably from about 1 $\mu$m to about 10 $\mu$m. Such fibers have excellent thermal stability and inertness. They are reasonably resistant to corrosion in water, dilute sodium hydroxide, and dilute hydrochloric acid.

The following specific examples illustrating the best presently-known methods of practicing this invention are described in detail in order to facilitate a clear understanding of the invention. It should be understood, however, that the detailed expositions of the application of the invention, while indicating preferred embodiments, are given by way of illustration only and are not to be construed as limiting the invention since various changes and modifications within the spirit of the invention will become apparent to those skilled in the art from this detailed description.

EXAMPLE 1

(a) Dry Mix Procedure (1) Sodium dihydrogen phosphate ($NaH_2PO_4$, 4852.0 g, 40.4 moles) was charged to a jacketed ribbon blender and delumped by blending at the maximum blending rate for 10 minutes. The blender speed was then reduced to a moderate rate and 7831.0 g (33.5 moles) of calcium phosphate [$Ca(H_2PO_4)_2$] was charged to the blending $NaH_2PO_4$ over a 10-minute period. Cooling water was introduced into the jacket of the ribbon blender at a rate sufficient to maintain the blending $NaH_2PO_4$—$Ca(H_2PO_4)_2$ mix at a temperature of 30° C. or less and the mix blended at the maximum blending rate for 30 minutes to intimately mix the $NaH_2PO_4$ and the $Ca(H_2PO_4)_2$. Orthophosphoric acid ($H_3PO_4$, 85%, 916.0 g, 7.9 moles) was sprayed onto the surface of the $NaH_2PO_4$—$Ca(H_2PO_4)_2$ mix over a 30-minute period, with continued blending at the maximum rate, via a spray tube positioned just above the surface of the $NaH_2PO_4$—$Ca(H_2PO_4)$ mix using nitrogen as the carrier gas. Upon completion of the addition of the orthophosphoric acid, blending at the maximum rate was continued for an additional 30 minutes. The resulting blended mix, containing 75.7% by weight solids and a mol percent composition on a dry basis of 32.5 mol percent CaO, 16.9 mol percent $Na_2O$, and 50.6 mol percent $P_2O_5$, was placed in an evaporating dish and heated at 400° C. for two hours.

The degree of crystallinity of the resulting substantially crystalline calcium sodium metaphosphate was calculated as follows:

(a) Density - Equation (1)

$d_{sc} = 2.76$ $d_{Oc} = 2.59$ $d_{100c} = 2.84$ $DC = [(2.76 - 2.59)/(2.84 - 2.59)] \times 100$ $= (0.17/0.25) \times 100$ $= 68.0\%$ (b) Differential Thermal Analysis (DTA) - Equation (2)

$pa_{sc} = 63.43$ $m_{sc} = 204.39$ $pa_{100c} = 98.55$ $m_{100c} = 200.08$ $DC = [(63.43/204.39)/(98.55/200.08)] \times 100$ $= (0.31/0.49) \times 100$ $= 63.3\%$ (2) To a stainless steel jacketed conical vacuum dryer with a stainless steel orbital screw mixer was charged 175.08 kg (1459.1 moles) of powdered sodium dihydrogen phosphate ($NaH_2PO_4$) and mixing was initiated. Powdered calcium phosphate [$Ca(H_2PO_4)_2$ 317.51 kg (1356.9 moles] was added to the $NaH_2PO_4$ and mixing continued for an additional 15 minutes. Orthophosphoric acid ($H_3PO_4$, 85%, 16.76 kg, 145.4 moles) was sprayed onto the surface of the $NaH_2PO_4$—$Ca(HPO_4)_2$ mix, with continued mixing, over a period of 12 minutes. After completion of the $H_3PO_4$ addition, the vacuum dryer was sealed and evacuated to approximately $9.82 \times 10^4$ pascals (Pa). The vacuum dryer was then heated with oil in the dryer jacket to 260° C. The dry mix was mixed and heated in this manner for 6.67 hours. At the end of this period, preheated air having a temperature ranging from 66° C. to 260° C. was introduced into the bottom of the mixer to fluidize the dry mix over a period of 10.33 hours. During this time period, the pressure in the vacuum mixer ranged from $6.77 \times 10^4$ Pa to $9.48 \times 10^4$ P. The heated mix was allowed to cool to ambient temperatures, the fluidized air was turned off, and the pressure was allowed to return to atmospheric pressure. The resulting product, characterized by a flowable powder consistency, had a mol percent composition on a dry basis of 32.2 mol percent CaO, 17.1 mol percent $Na_2O$, and 50.7 mol percent $P_2O_5$, and a degree of crystallinity of 68% as determined by density measurements and 63% as determined by DTA measurements.

(b) Wet Mix Procedure (1) An aqueous solution (35.00 kg) containing 3.41 kg (24.0 moles) of phosphorus pentoxide ($P_2O_5$), 0.41 kg (6.6 moles) of sodium oxide ($Na_2O$), and 0.68 kg (12.1 moles) of calcium oxide (CaO) dissolved in 30.50 kg (1694.4 moles) of water ($H_2O$) was charged to a 100 l stainless steel recirculating slurry tank and the pH adjusted to a value between 10 and 11 by the addition of 0.82 kg (10.2 moles) of 50% by weight aqueous sodium hydroxide (NaOH). To this solution, which was stirred and recirculated, was added 10.67 kg (144.2 moles) of calcium hydroxide [($Ca(OH)_2$] to yield a homogeneous slurry. The slurry was thereafter added, with stirring and recirculation to 52.80 kg (457.9 moles) of 85% aqueous orthophosphoric acid ($H_3PO_4$) contained in a 600 l stainless steel tank fitted with circulating watercooled coils at a rate sufficient to maintain the temperature between 40° C. and 95° C., followed by the addition of 11.71 kg (146.3 moles) of 50% aqueous NaOH, also at a rate sufficient to maintain the temperature between 40° C. and 95° C. The resulting slurry contained approximately 45% by weight solids and the mol percent of components on a dry basis was 31.6 mol percent CaO, 17.2 mol percent $Na_2O$, and 51.2 mol percent $P_2O_5$.

A 55.88 cm (22 in.) inside diameter $\times$ 48.26 cm (19 in.) long stainless steel tube, including a 12.70 cm (5 in.) long $\times$ 15.24 cm (6 in.) high discharge chute at one end thereof, having its longitudinal axis oriented along a horizontal line and having a centrally located 15.24 cm (6 in.) circular opening in one end and the previously noted 15.24 cm (6 in.) high $\times$ 12.70 cm (5 in.) long discharge chute at the other end and fitted with eight 2.54-cm (1-in.) lifters equally spaced and welded lengthwise to the inside walls, a 45.72-cm (18 in.) long gas-fired, air-cooled line burner containing two parallel rows of six flame nozzles spaced 5.08 cm (2 in.) apart, center-to-center, and having a maximum firing rate of $2.53 \times 10^5$ joules/hr. (J/hr, 240 BTU/hr), a reciprocating spray nozzle, and a motor driven rotation drive was used as the calcination apparatus.

The calcination apparatus was charged with 47.17 kg (104 lb) of (calcined) substantially crystalline calcium sodium metaphosphate, which formed a bed depth of 15.24 cm (6 in.), and heated, while rotating, with the line burner to a temperature of about 400° C. The wet mix slurry from above (110.95 kg, 244.6 lb) was pumped via a metering pump to the reciprocating spray nozzle and sprayed onto the heated bed of substantially crystalline calcium sodium metaphosphate over a 3.7-hr period at a rate sufficient to maintain the bed temperature and produce 53.7 kg/hr-m$^2$(11.0 lb/hr-ft$^2$) of substantially crystalline calcium sodium metaphosphate. A total of 46.053 kg (101.53 lb) of substantially crystalline calcium sodium metaphosphate was collected having a degree of crystallinity substantially the same as that determined for the dry mix product of Part (a). The material was crushed in a jaw crusher to −6 mesh (U.S. Standard Sieve Size, 3.35 mm) and stored in a moisture tight container for subsequent use in Example 2(c) below. The procedure was repeated several times to collect the desired quantity of substantially crystalline calcium sodium metaphosphate.

EXAMPLE 2

Crystalline Calcium Sodium Metaphosphate (a) The substantially crystalline calcium sodium metaphosphate 1800.0 g (3.9 lb) from Example 1(a)(1) above was placed in a porcelain evaporating dish and heated in an ashing furnace to 1000° C. The material was maintained at this temperature for one hour, during which time the substantially crystalline calcium sodium metaphosphate formed a homogeneous melt. The molten material was allowed to cool to 720° C. to form a supercooled melt. The super cooled melt was seeded with a crystalline calcium sodium metaphosphate (phosphate fiber) pellet (prepared as described in Example 3 below) and maintained isothermally at 720° C. for 12 hours to completely crystallize the calcium sodium metaphosphate melt. The crystalline material was cooled to ambient (room) temperature, removed from the evaporating dish, passed through a mechanical jaw crusher, and fiberized by dry milling in an air classification mill. The fibers had an average aspect ratio of 60, an average diameter of 2.0 μm, and a surface area of 7067 cm$^2$/g.

The average aspect ratio was calculated using the equation:

Aspect Ratio
$(L/D) = [(9.76 \cdot V + 72.0)^{0.5} - 11.5]/0.244$ wherein V is the packed volume (in cm$^3$) of the asbestiform crystalline calcium sodium metaphosphate fiber, as determined using a Vanderkamp Tap Density Tester according to standard operating instructions supplied by the manufacturer. The aspect ratio equation was derived via a quadratic least squares analysis of data presented by Milewski, *A Study of The Packing of Fibers and Spheres*, University Microfilms, Ann Arbor, 1973, p. 83 which correlates aspect ratio with bulk density over the range of 1–70.

The average fiber diameter was calculated using the equation:

Equivalent Cylindrical Diameter = ($\frac{2}{3}$) (Equivalent Spherical Diameter)

wherein the equivalent spherical diameter was measured using a Fisher Sub-sieve Sizer according to standard operating instructions supplied by the manufacturer.

The surface area of the asbestiform crystalline calcium sodium metaphosphate fibers was calculated from the mean particle diameter using the equation:

$S = 60,000/(d \cdot P)$ wherein S is the surface area in cm$^2$/g; d is the equivalent spherical diameter in μm; and P is the time density in g/cm$^3$ as determined by mercury displacement using an Aminco-Porisimeter.

(b) The substantially crystalline calcium sodium metaphosphate (2200.0 g, 4.9 lb) from Example 1(a)(2) above was placed in a procelain evaporating dish and heated in an ashing furnace to 1000° C., which temperature was maintained for one hour. The resulting homogenous melt was treated as described in Procedure (a) above to produce crystalline calcium sodium metaphosphate fibers having an average aspect ratio of 58, an average diameter of 2.0 μm, and a surface area of 7067 cm$^2$/g, all determined as described in Example 2(a) above.

(c) A continuous mesh belt furnace having in series a 22.86 cm (9 in.) long pre-melting zone, a 45.72 cm (18 in.) long melting zone, a 30.48 cm (12 in.) long post-melting zone, a 68.58 cm (27 in.) long first cooling zone fitted with an automated gravity drop pellet seeder assembly, a 274.32 cm (108 in.) long crystallization zone, and a 190.5 cm (75 in.) long second cooling zone divided into a 68.58 cm long gas-cooled subzone, followed by a 121.92 cm (48 in.) long water-cooled subzone was employed to melt and completely crystallize the calcined substantially crystalline calcium sodium metaphosphate. The furnace was fitted at its entrance and exit ends with inlets for introducing a desired gas into the furnace to facilitate purging of the furnace with an inert gas to provide the desired atmosphere and with stainless steel baffle curtains to prevent the entrance of undesirable gases into the furnace.

Substantially crystalline calcium sodium metaphosphate (47.63 kg, 105.0 lb) from Example 1(b) above was loaded into six graphite trays of 30.48 cm×30.48 cm×8.89 cm (12 in.×12 in.×3.5 in.) having a wall thickness of 1.27 cm (0.5 in.) and placed on the mesh belt of the mesh belt furnace. The mesh belt furnace was heated in the melting zone to about 980° C. and a continuous stream of dry nitrogen was introduced into the furnace at each end thereof to purge the furnace of air and to provide a substantially inert atmosphere. The loaded trays were started through the furnace at a rate of 0.381 cm/min (0.15 in./min). The temperature gradient in the pre-melting zone gradually increased from ambient temperature to about the melting temperature (980°) of the melting zone. The residence time in the melting zone was two hours, during which time the calcium sodium metaphosphate formed a homogeneous melt. Thereafter, the trays containing the homogeneous melt were passed first into the post-melting zone for an initial cooling of the melt, then into the first cooling zone and cooled over a 2.83-hr. period to about 720° C. to form a supercooled melt. The supercooled melt was seeded at the midpoint of the first cooling zone with crystalline calcium sodium metaphosphate (Phosphate Fiber) pellets (prepared as described in Example 3 below) and maintained isothermally at the seeding temperature throughout the remaining portion of the first cooling zone and the crystallization zone, during which time the seeded homogeneous melt was transformed into a mass of crystalline calcium sodium metaphosphate. The crystalline material was thereafter passed into the second cooling zone of the furnace and slowly cooled to ambient (room) temperature. The crystalline mass was removed from the graphite trays, broken apart, passed through a mechanical jaw crusher, and then fiberized by dry milling in an air classification mill. The fibers had an average aspect ratio of 60, an average diameter of 2.0 μm, and a surface area of 7067 cm$^2$/g, all determined as described in Example 2(a) above.

EXAMPLE 3

Calcium Sodium Metaphosphate Crystalline Seed Pellets

Calcium sodium metaphosphate crystal fines less than 40 mesh (U.S. Standard Sieve Size, 425 μm) and larger than 60 mesh (250 μm), also expressed as $-40, +60$ or 40/60 mesh, were mixed with 0.25 weight percent poly(ethylene glycol) (Carbowax) as a binding and lubricating agent and pressed into 0.635 cm×0.635 cm (0.25 in.×0.25 in.) pellets for use in seeding the supercooled melt of Example 2 above.

Thus, it is apparent that there has been provided, in accordance with the instant invention, a process for the preparation of asbestiform crystalline calcium sodium metaphosphate fibers that fully satisfy the objects and advantages set forth hereinabove. While the invention has been described with respect to various specific examples and embodiments thereof, it is understood that the invention is not limited thereto and that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A process for the preparation of asbestiform crystalline calcium sodium metaphosphate fibers, which process comprises:
    (a) heating substantially crystalline calcium sodium metaphosphate, or at least one compound convertible by heat thereto, having a composition on a dry basis equivalent to a CaO/Na$_2$O/P$_2$O$_5$ mol percent ratio of about 29.0–34.0/16.0–18.0/50.0–53.0 and a degree of crystallinity from about 60% to about 75% as determined from density and differential thermal analysis measurements in a melting zone at a temperature and for a time sufficient to form a homogeneous melt;
    (b) cooling the homogeneous melt in a cooling zone to a temperature and at a rate sufficient to form a supercooled melt;
    (c) introducing into the supercooled melt at least one seed crystal of asbestiform crystalline calcium sodium metaphosphate;
    (d) maintaining the seeded supercooled melt under isothermal conditions at the seeding temperature for a time sufficient to form crystalline blocks of asbestiform calcium sodium metaphosphate; and
    (e) fiberizing the crystalline blocks of asbestiform calcium sodium metaphosphate into fibers.

2. The process of claim 1 wherein the CaO/Na$_2$O/P$_2$O$_5$ mol percent is about 31.4–31.8/17.1–17.3/51.1–51.3.

3. The process of claim 1 wherein the substantially crystalline calcium sodium metaphosphate is heated at a temperature from about 740° C. to about 1000° C. for about two hours.

4. The process of claim 3 wherein the heating is carried out at a temperature from about 920° C. to about 980° C.

5. The process of claim 1 wherein the homogeneous melt is cooled to a temperature from about 690° C. to about 735° C. at a rate from about 1° C./min. to about 3° C./min.

6. The process of claim 5 wherein the cooling temperature is from about 705° C. to about 730° C.

7. The process of claim 1 wherein the seed crystals are introduced into the supercooled melt in a generally symmetrical pattern with respect to the surface thereof at a rate sufficient to provide about one seed crystal for about each 100.0 cm$^2$ to about 1000.0 cm$^2$ of supercooled melt surface area.

8. The process of claim 1 wherein the seeded supercooled melt is maintained isothermally at the seeding temperature for a time from about five hours to about 15 hours.

9. The process of claim 8 wherein the crystallization time is from about seven hours to about 10 hours.

10. The process of claim 1 wherein the crystalline blocks are fiberized by a process selected from grinding, crushing, levigating, triturating, and milling.

11. The process of claim 10 wherein the fiberization was effected by milling.

12. The process of claim 11 wherein the milling was carried out by dry milling in an air classification mill.

13. The process of claim 1 wherein the melting, crystallization, and cooling operations of steps (a)–(d) are performed in a graphite container.

14. The process of claim 1 wherein the melting, crystallization, and cooling operations of steps (a)–(d) are conducted under an inert atmosphere.

15. The process of claim 14 wherein the inert atmosphere is selected from the group consisting of nitrogen, helium, argon and mixtures thereof.

16. The process of claim 15 wherein the inert atmosphere is nitrogen.

17. The process of claim 1 wherein the substantially crystalline calcium sodium metaphosphate is produced in situ from at least one precursor compound thereof under the heating conditions of step (a) prior to formation of the homogeneous melt.

18. The process of claim 17 wherein the precursor compound is calcium sodium orthophosphate.

19. The process of claim 1 wherein the substantially crystalline calcium sodium metaphosphate in step (a) is characterized by a degree of crystallinity from about 60% to about 70%.

20. The process of claim 19 wherein the degree of crystallinity is between about 63% and about 68%.

* * * * *